J. A. STONE.
CORN HUSKER.
APPLICATION FILED JULY 24, 1909.
948,297.
Patented Feb. 1, 1910.
2 SHEETS—SHEET 1.
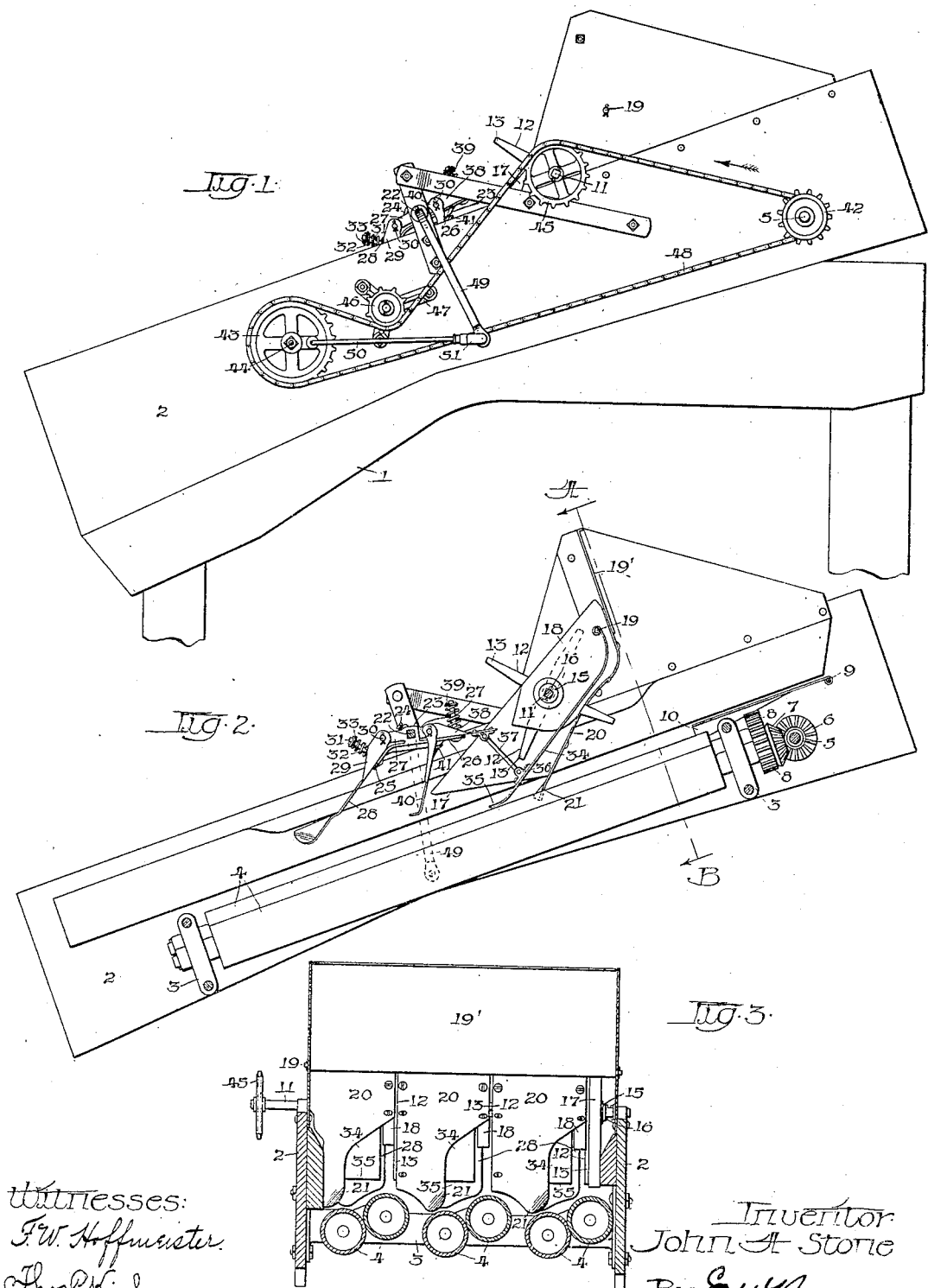
Witnesses:
F. W. Hoffmeister
Thos. P. Kiely
Inventor
John A. Stone
By E. W. Burgess
Attorney J. A. STONE.
CORN HUSKER.
APPLICATION FILED JULY 24, 1909.
948,297.
Patented Feb. 1, 1910.
2 SHEETS—SHEET 2.
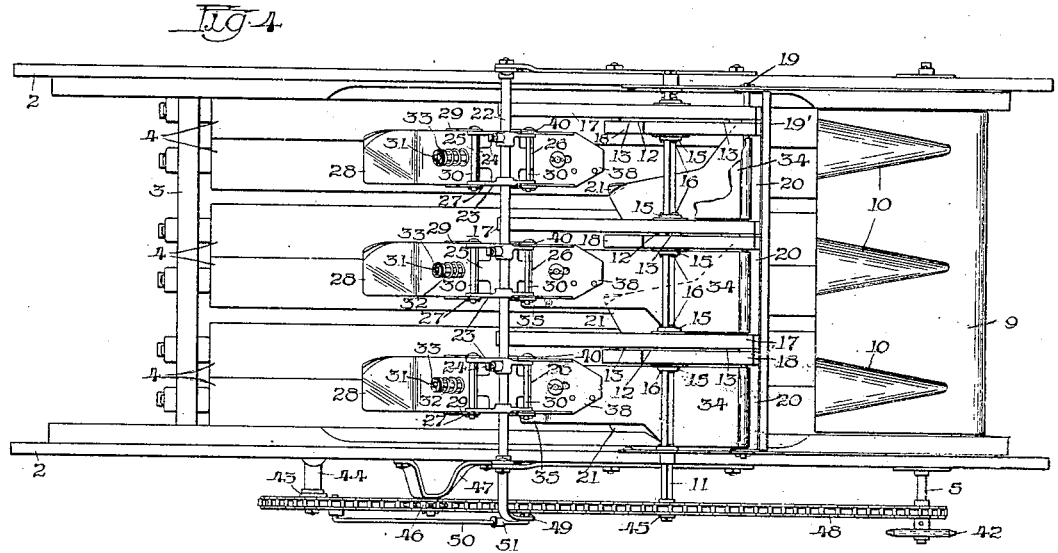
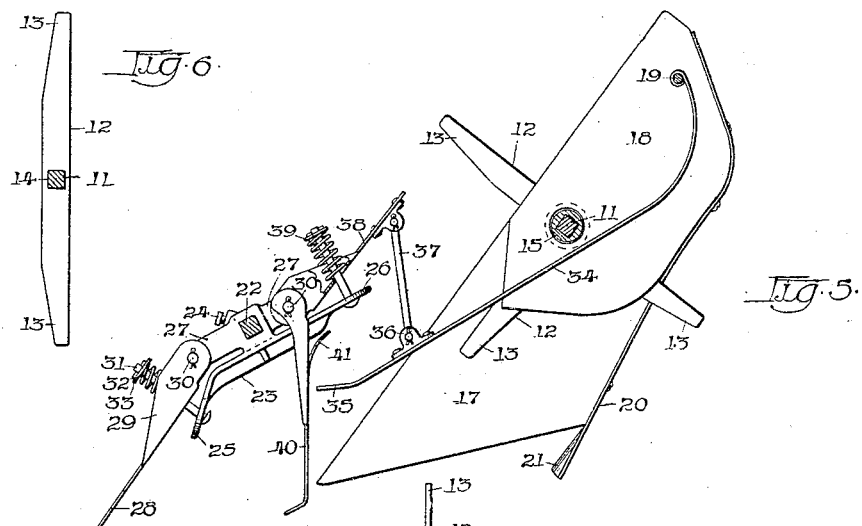
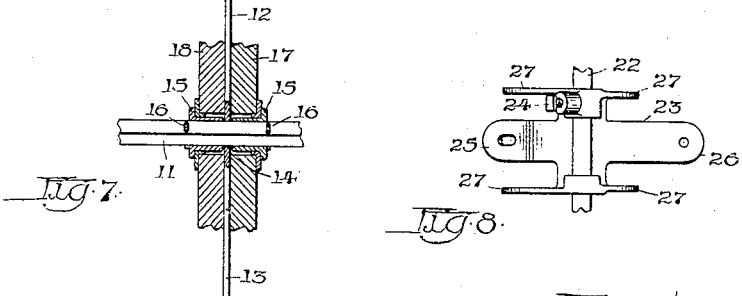
Witnesses:
F. W. Hoffmeister
Thos. C. Kiely
Inventor
John A. Stone
By E. W. Burgess
Attorney

UNITED STATES PATENT OFFICE.

JOHN A. STONE, OF CHICAGO, ILLINOIS.

CORN-HUSKER.

948,297.  Specification of Letters Patent.  Patented Feb. 1, 1910.

Application filed July 24, 1909. Serial No. 509,305.

*To all whom it may concern:*

Be it known that I, JOHN A. STONE, a citizen of the United States, residing at Chicago, in the county of Cook and State of Illinois, have invented certain new and useful Improvements in Corn-Huskers, of which the following is a specification.

My invention relates to corn husking mechanism, and in particular to a form of ear retarding means to present the unhusked ears to the operative surfaces of the coacting rollers in a manner whereby the latter may be effective in removing the husks from the ears and also allow the ears to pass from the husking mechanism after the husks have been removed; its object being to provide a mechanism simple in construction and effective in operation. I attain this object by means of the mechanism illustrated by the accompanying drawing, in which—

Figure 1 is a side elevation of a corn husking mechanism having my invention forming a part thereof; Fig. 2 is a longitudinal section of Fig. 1; Fig. 3 is a cross section of Fig. 2 along line A—B; Fig. 4 is a top plan view of Fig. 1; Fig. 5 is an enlarged detail, partly in section, representing a part of the retarding mechanism; Fig. 6 is a detail of one of the arms forming part of a rotatable feeder; Fig. 7 is a detail representing the manner of mounting the feeder arms upon the driving shaft; and Fig. 8 is a detail of part of the ear retarding means.

Like reference characters designate the same parts throughout the several views.

1 represents a base frame, upon which is mounted a husker frame, including side members 2, to which are secured, at opposite ends thereof, transverse side frame members 3, in which are journaled a series of pairs of husking rollers 4, one roller of each pair being located in a plane above that of its coacting roller, as shown in Fig. 3. The rollers are inclined downward in the direction of their delivery ends, and are driven in a common way by means of a transverse shaft 5 journaled in the side members of the husker frame at the receiving ends of the rollers, having bevel pinions 6 secured thereto that mesh with like pinions 7 secured to one of the rollers of each pair, and each roller is provided with a spur pinion 8 that meshes with one upon its coacting roller in a manner to transmit motion from the driving to the driven rollers in an opposite direction.

9 designates an inclined feed table at the receiving ends of the rollers, upon which the unhusked ears are deposited and are there delivered to the husking rollers. The table is provided with longitudinally arranged trough-like portions 10, opposite each pair of rollers, diverging in the direction of and overlapping the receiving ends of the rollers and designed to assist in presenting the ears lengthwise of the rollers.

A transverse angular feeder shaft 11 is journaled in the sides of the husker frame above the receiving ends of the rollers, and mounted thereon are a series of rotary feeders 12, including blades 13 having openings 14 adapted to receive the shaft, the blades operating in planes parallel with the axes of the husking rollers and substantially in line with the axes of the upper rollers.

15 represents cylindrical thimbles having central openings that receive the shaft, and pins 16, passing through the shaft, hold the thimbles against endwise movement thereon, upon opposite sides of the blades, the thimbles being journaled in longitudinally arranged ear guides 17 and 18, the guide 17 extending farther toward the delivery end of the rollers than the one upon the opposite side of the feeders. The long guides have their lower ends in close proximity to the rollers and diverge upward therefrom in the direction of the delivery end of the roller, the lower ends of the short guides being formed eccentric to the axis of the shaft for the purpose of operating as strippers for the feeder blades, the upper ends of both guides being curved forward and upward. The rod 19 is extended transversely across the frame in front of the feeder shaft and passes through openings in the upper ends of the guides.

19¹ represents a plate extending across the husker frame in front of and above the guides 17 and 18 and overlapping the upper portions of their ends, as shown in Fig. 2. A series of plates 20 are secured to the lower edges of the guides, having their forward ends conforming to the curved guides, but a portion at their lower ends is cut away laterally in a manner to leave a narrow tongue portion 21 extending downward in the direction of the delivery end of the rollers and in close proximity to the upper surface of the lower roller of each pair, the end of the tongue portion being twisted in a manner to present a curved surface adapted to direct the ears toward the coacting rollers.

A transverse rock shaft 22 is mounted upon the husker frame above the rollers and substantially midway of their length. Mounted thereon are a series of rocker arms 23, secured to the shaft by means of set screws 24 and having arms 25 and 26 provided with flat surfaces extending in opposite directions from the axis of the shaft; the rear arm 25 being deflected downward at its outer end.

27 represents vertically arranged ear portions extending parallel with the arms, upon opposite sides thereof, and provided with transverse openings therein.

28 represents ear retarding members in rear of the rock shaft formed of sheet metal, having upturned ear portions 29 upon opposite sides of their upper ends that are provided with transverse openings adapted to receive pins 30 whereby they are pivotally connected with the rearward ear portions 27 of the rocker arms, and 31 represents bolts connecting the retarding members with the deflected portion of arm 25 in rear of their connection with the rocker arms. Coil springs 32 are placed between the retarding members and washers 33 at the upper ends of the bolts, and operate in a manner to yieldingly press the retarding members toward the rocker arms. The ear retarding members extend rearward and downward toward the delivery end of the rollers, and have a portion of their lower ends turned up in a longitudinal direction upon the side in the direction of the higher rollers of each pair for the purpose of deflecting the ears in that direction, the members being yieldingly held in contact with the ears by the action of the springs. Other ear retarders 34 are located in front of the first mentioned members toward the receiving ends of the rollers, having their upper ends curved upward and turned around the rod 19 in a manner to turn freely thereon. The lower ends of the ear retarders have a turned up portion 35, and 36 represents an ear cap secured to the upper side thereof, near its lower end, which is connected by means of links 37 with one end of an arm 38, that has its opposite end pivotally connected with the ear portions of the rocker arms 23. The arms 38 are yieldingly pressed toward the rocker arms by means of coil springs 39 connected therewith in the same manner as springs 32 upon the opposite sides of the shaft. Intermediate ear retarders 40 have their upper ends pivotally connected with rocker arms 23, coaxially with arms 38, having their lower ends turned upward and rearward.

41 represents a spring portion deflected in the direction of the receiving ends of the rollers and engaging with the lower surface of the rocker arms in a manner to yieldingly oppose a swinging movement of the ear retarder in the same direction.

Motion is communicated to the various operative parts of the mechanism by means of a sprocket wheel 42 secured to the outer end of the transverse shaft 5 forming part of the means for transmitting motion to the husking rollers, sprocket wheel 43, mounted upon a stud 44, secured to the side of the husker frame near the delivery end thereof, and sprocket wheel 45, secured to the end of the feeder shaft 11, and tightener sprocket 46, journaled upon a bracket 47, secured to the husker frame, and a sprocket chain 48 engaging the several sprocket wheels. A depending arm 49 forms a part of the rock shaft 22 and its lower end is connected to a crank pin 50 by means of a pitman 51, the crank pin being secured to the sprocket wheel 43, whereby a continuous rocking motion is given to the shaft and the rocker arms in a manner to alternately raise and depress the ear retarders upon opposite sides of the shaft.

What I claim as my invention, and desire to secure by Letters Patent, is:

1. A corn husking mechanism including, in combination, a series of coacting pairs of husking rollers inclined downward from their receiving toward the delivery ends thereof, one roller of each pair being in a plane above that of the adjacent roller, a feed table at the receiving ends of said rollers, a rotary feeder located above said rollers near the receiving ends thereof, said feeder including a transverse shaft and a series of blades mounted thereon, said blades being spaced apart in a manner to be operative in planes parallel with the axes of the husking rollers and substantially in line with the axes of the upper rollers.

2. A corn husking mechanism including, in combination, a series of pairs of coacting husking rollers inclined downward from their receiving toward the delivery ends thereof, one roller of each pair being in a plane above that of the adjacent roller, a feed table at the receiving ends of said rollers, a rotary feeder located above said rollers near the receiving ends thereof, said feeder including a transverse shaft and a series of blades mounted thereon, said blades being spaced apart in a manner to be operative in planes parallel with the axes of the husking rollers and substantially in line with the axes of the upper rollers, ear guides mounted upon said shaft upon opposite sides of said blades adjacent thereto, one of said guides extending downward toward the delivery ends of said rollers and having its lower end disposed at an angle upward and rearward relative to said rollers.

3. A corn husking mechanism including, in combination, a series of pairs of coacting husking rollers inclined downward from their receiving toward the delivery ends thereof, one roller of each pair being in a plane above that of the adjacent roller, a feed table at the receiving ends of said rollers, a rotary feeder located above said rollers near the receiving ends thereof, said feeder including a transverse shaft and a series of blades mounted thereon, said blades being spaced apart in a manner to be operative in planes parallel with the axes of the husking rollers and substantially in line with the axes of the upper rollers, ear guides mounted upon said shaft upon opposite sides of said blades and adjacent thereto, one of said guides extending downward toward the delivery ends of said rollers and having its lower end disposed at an angle upward and rearward relative to said rollers, the other end being shorter and having its lower end eccentric to the axis of the shaft.

4. A corn husking mechanism including, in combination, a series of pairs of coacting husking rollers inclined downward from their receiving toward the delivery ends thereof, one roller of each pair being in a plane above that of the adjacent roller, a feed table at the receiving ends of said rollers, a rotary feeder located above said rollers near the receiving ends thereof, said feeder including a transverse shaft and a series of blades mounted thereon, said blades being spaced apart in a manner to be operative in planes parallel with the axes of the husking rollers and substantially in line with the axes of the upper rollers, ear guides mounted upon said shaft upon opposite sides of said blades and adjacent thereto, one of said guides extending downward toward the delivery ends of the rollers and having its lower end disposed at an angle upward and rearward relative to said rollers, the other end being shorter and having its lower end eccentric to the axis of the shaft and operative as a stripper for the feeder blades, the opposite ends of said guides being curved upward, plates secured to the lower edges of said guides, said plates extending downward at their rear ends in close proximity to the husking rollers.

5. A corn husking mechanism including, in combination, a series of pairs of coacting husking rollers inclined downward from their receiving toward the delivery ends thereof, one roller of each pair being in a plane above that of the adjacent roller, a feed table at the receiving ends of said rollers, a rotary feeder located above said rollers near the receiving ends thereof, said feeder including a transverse shaft and a series of blades mounted thereon, said blades being spaced apart in a manner to be operative in planes parallel with the axes of the husking rollers and substantially in line with the axes of the upper rollers, ear guides mounted upon said shaft upon opposite sides of said blades and adjacent thereto, one of said guides extending downward toward the delivery ends of said rollers and having its lower end disposed at an angle upward and rearward relative to said rollers, the other end being shorter and having its lower end eccentric to the axis of the shaft and operative as a stripper for the feeder blades, the opposite ends of said guides being curved upward, plates secured to the lower edges of said guides, said plates extending downward at their rear ends and having a cut-away portion upon the side in the direction of the upper roller, the extended end thereof being turned laterally upward in a manner to form a deflector operative to direct the ears toward said rollers.

6. A corn husking mechanism including, in combination, a husker frame, a series of pairs of coacting husking rollers mounted in said frame and inclined downward from their receiving toward the delivery ends thereof, one roller of each pair being in a plane above that of the adjacent roller, a transverse rock shaft mounted upon said frame above said rollers and intermediate the ends thereof, rocker arms secured to said rock shaft and extending upon opposite sides thereof, ear retarders pivotally connected with said arms upon the side of the shaft in the direction of the delivery ends of said rollers and extending downward in close proximity to said rollers, springs operative to depress said ear retarders relative to said arms, a depending arm secured to said rock shaft, a sprocket wheel upon a stud secured to the husker frame, a crank pin forming a part of said sprocket wheel, a pitman connection between said depending arm and said pin, and means for rotating said sprocket wheel.

7. A corn husking mechanism including, in combination, a husker frame, a series of pairs of coacting husking rollers mounted upon said frame and inclined downward from their receiving toward the delivery ends thereof, one roller of each pair being in a plane above that of the adjacent roller, a transverse rock shaft mounted upon said frame above said rollers and intermediate the ends thereof, rocker arms secured to said rock shaft and extending upon opposite sides thereof, ear retarders pivotally connected with said arms upon the side of the shaft in the direction of the delivery ends of said rollers and extending downward in close proximity to said rollers, springs operative to depress said ear retarders relative to said arms, auxiliary ear retarders having their forward ends pivotally connected with a fixed part of the husker frame, spring-held arms pivotally connected with the rocker arms upon the receiving side of the rock shaft, the auxiliary ear retarders having their rear ends in close proximity to the husking rollers and connected by means of links with said spring-held arms, a depending arm secured to said rock shaft, and means for swinging said arm in opposite directions in a manner to rock said shaft and alternately raise and depress said ear retarders.

8. A corn husking mechanism including, in combination, a husker frame, a series of pairs of coacting husking rollers mounted upon said frame and inclined downward from their receiving toward the delivery ends thereof, one roller of each pair being in a plane above that of the adjacent roller, a transverse rock shaft mounted upon said frame above said rollers and intermediate the ends thereof, rocker arms secured to said rock shaft and extending upon opposite sides thereof, ear retarders pivotally connected with said arms upon the side of the shaft in the direction of the delivery ends of said rollers and extending downward in close proximity to said rollers, springs operative to depress said ear retarders relative to said arms, auxiliary ear retarders having their forward ends pivotally connected with a fixed part of the husker frame, spring-held arms pivotally connected with the rocker arms upon the receiving side of said rock shaft, the auxiliary ear retarders having their rear ends in close proximity to the husking rollers and connected by means of links with said spring-held arms, supplemental ear retarders pivotally connected with said rocker arms intermediate the first named ear retarders and yieldingly held against a free swinging movement upon said rocker arms.

JOHN A. STONE.

Witnesses:
A. B. DACK,
JOS. S. FICHT.